(12) United States Patent
Liu (10) Patent No.: US 12,408,120 B2
(45) Date of Patent: Sep. 2, 2025

(54) PARAMETER CONFIGURATION METHOD, APPARATUS, COMMUNICATION DEVICE, AND STORAGE MEDIUM

(71) Applicant: Beijing Xiaomi Mobile Software Co., Ltd., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 313 days.

(21) Appl. No.: 18/025,355

(22) PCT Filed: Sep. 11, 2020

(86) PCT No.: PCT/CN2020/114679
§ 371 (c)(1),
(2) Date: Mar. 8, 2023

(87) PCT Pub. No.: WO2022/052024
PCT Pub. Date: Mar. 17, 2022

(65) Prior Publication Data
US 2023/0337148 A1    Oct. 19, 2023

(51) Int. Cl.
*H04W 52/32* (2009.01)
*H04W 52/34* (2009.01)

(52) U.S. Cl.
CPC ....... *H04W 52/322* (2013.01); *H04W 52/346* (2013.01)

(58) Field of Classification Search
CPC .......................... H04W 52/322; H04W 52/346
See application file for complete search history.

(56) References Cited

U.S. PATENT DOCUMENTS

| | | |
|---|---|---|
| 2013/0171975 A1 | 7/2013 | Lindner et al. |
| 2017/0086212 A1 | 3/2017 | Kim et al. |
| 2017/0094621 A1 | 3/2017 | Xu et al. |
| 2017/0127408 A1 | 5/2017 | Du |
| 2018/0124612 A1 | 5/2018 | Babaei et al. |
| 2019/0174466 A1* | 6/2019 | Zhang ................... H04L 5/0057 |
| 2020/0053811 A1 | 2/2020 | Ang et al. |
| 2020/0221506 A1 | 7/2020 | Jeon et al. |

(Continued)

FOREIGN PATENT DOCUMENTS

| | | |
|---|---|---|
| CN | 106211335 A | 12/2016 |
| CN | 106559903 A | 4/2017 |

(Continued)

OTHER PUBLICATIONS

Qualcomm Incorporated: ""R1-1905010_Synchronization design for NR V2X"", {3GPP TSG_RAN 1 \WG1_RL1) , Mar. 30, 2019 (Mar. 30, 2019).

(Continued)

*Primary Examiner* — David Bilodeau
(74) *Attorney, Agent, or Firm* — Volpe Koenig (57) ABSTRACT

A parameter configuration method, an apparatus, a communication device, and a storage medium, where different synchronization signal blocks (SSB) are configured for different types of user equipment (UE), where, in the SSBs respectively associated with the different types of UE, energy per resource element (EPRE) difference parameter ranges between physical broadcast channels (PBCH) and synchronization signals are different.

20 Claims, 8 Drawing Sheets

(56) References Cited

U.S. PATENT DOCUMENTS

| | | | |
|---|---|---|---|
| 2020/0228966 | A1 | 7/2020 | Xu et al. |
| 2020/0329437 | A1* | 10/2020 | MolavianJazi ....... H04W 76/15 |
| 2023/0075764 | A1* | 3/2023 | Liu ....................... H04W 48/16 |
| 2023/0115798 | A1* | 4/2023 | Lee .................... H04W 52/362 |
| | | | 370/318 |
| 2023/0126705 | A1* | 4/2023 | Abotabl .............. H04W 52/245 |
| | | | 455/522 |

FOREIGN PATENT DOCUMENTS

| | | |
|---|---|---|
| CN | 107432028 A1 | 12/2017 |
| CN | 109315006 A | 2/2019 |
| CN | 109315008 A | 2/2019 |
| CN | 110603852 A | 12/2019 |
| CN | 111095846 A | 5/2020 |
| CN | 111345072 A | 6/2020 |
| CN | 111525995 A | 8/2020 |
| WO | 2017054492 A1 | 4/2017 |
| WO | 2019098769 A1 | 5/2019 |
| WO | 2020032691 A1 | 2/2020 |

OTHER PUBLICATIONS

BlackBerry UK Limited, "UL Transmit Power Control for Dual Connectivity", 3GPP TSG RAN WG1 Meeting #77,R1-142355,Seoul, Korea, May 19-23, 2014.
Sunghyun Hwang, Consideration on Multi-link Operation, IEEE802.11-19/1181R1 (2019).

* cited by examiner

PARAMETER CONFIGURATION METHOD, APPARATUS, COMMUNICATION DEVICE, AND STORAGE MEDIUM

CROSS REFERENCE TO RELATED APPLICATION

The present application is a U.S. National Stage of International Application No. PCT/CN2020/114679, filed on Sep. 11, 2020, the contents of all of which are incorporated herein by reference in their entireties for all purposes.

BACKGROUND

At present, 3GPP has implemented the standard reduced capability NR devices (REDCAP) project study of a version 17 (R17), and the project goal is to reduce UE complexity and save costs in the case of coexistence with R15/16 terminals.

SUMMARY

The disclosure relates to the technical field of wireless communication, but is not limited to the technical field of wireless communication, in particular to a parameter configuration method, an apparatus, a communication device and a storage medium.

Examples of the disclosure provide a parameter configuration method, an apparatus, a communication device and a storage medium.

According to a first aspect of an example of the disclosure, a parameter configuration method is provided, applied to a base station, and includes: configuring different synchronization signal blocks (SSB) for different types of user equipment (UE), where, in the SSBs respectively associated with the different types of UE, energy per resource element (EPRE) difference parameter ranges between physical broadcast channels (PBCH) and synchronization signals are different.

According to a second aspect of an example of the disclosure, an information transmission method is provided, applied to UE, and includes: receiving, based on the type of the UE, an SSB associated with the type of the UE, where, in the SSBs respectively associated with the different types of UE, EPRE difference parameter ranges between PBCHs and synchronization signals are different.

According to a third aspect of an example of the disclosure, a communication device apparatus is provided, and includes a processor, a memory and executable programs stored on the memory and capable of being operated by the processor, where when operating the executable programs, the processor executes the step of the parameter configuration method according to the first aspect, and the step of the information transmission method according to the second aspect.

According to a fourth aspect of an example of the disclosure, a storage medium is provided, on which executable programs are stored, where when operated by the processor, the executable programs implement the step of the parameter configuration method according to the first aspect, or the step of the information transmission method according to the second aspect.

BRIEF DESCRIPTION OF THE DRAWINGS

The accompanying drawings here, which are incorporated in and constitute a part of the specification, illustrate examples consistent with the disclosure and together with the specification serve to explain the principles of the examples of the disclosure.

DETAILED DESCRIPTION

Examples will be described in detail here, as exemplified in the accompanying drawings. In response to determining that the description below relates to the accompanying drawings, unless otherwise indicated, the same numbers in different accompanying drawings indicate the same or similar elements. The implementations described in the following examples do not represent all implementations consistent with the examples of the disclosure. Rather, they are merely instances of apparatuses and methods consistent with some aspects of examples of the invention as detailed in the attached claims.

The terms used in the examples of the disclosure are merely intended to describe specific examples, and are not intended to limit the examples of the disclosure. The singular forms "a", "said" and "the" as used in the examples of the disclosure and the attached claims are also intended to include the plural form, unless the context clearly indicates otherwise. It should also be understood that the terms "and/or" used in the context indicate any or all possible combinations containing one or more associated listed items.

It should be understood that although the terms first, second third, etc. may be adopted to describe various information in the example of the disclosure, such information should not be limited to these terms. These terms are merely configured to distinguish the same type of information from each other. For example, within the scope of the example of the disclosure, first information may also be called second information, and the second information may also be called the first information. Depending on the context, the word "if" used here may be explained as "on . . . when" or "when" or "in response to determining".

At present, 3GPP has implemented the standard reduced capability NR devices (REDCAP) project study of a version 17 (R17), and the project goal is to reduce UE complexity and save costs in the case of coexistence with R15/16 terminals.

The reduced capability NR devices will affect the signal reception capability of the reduced capability NR devices after an antenna, a bandwidth and other capabilities are reduced.

Figure 1:
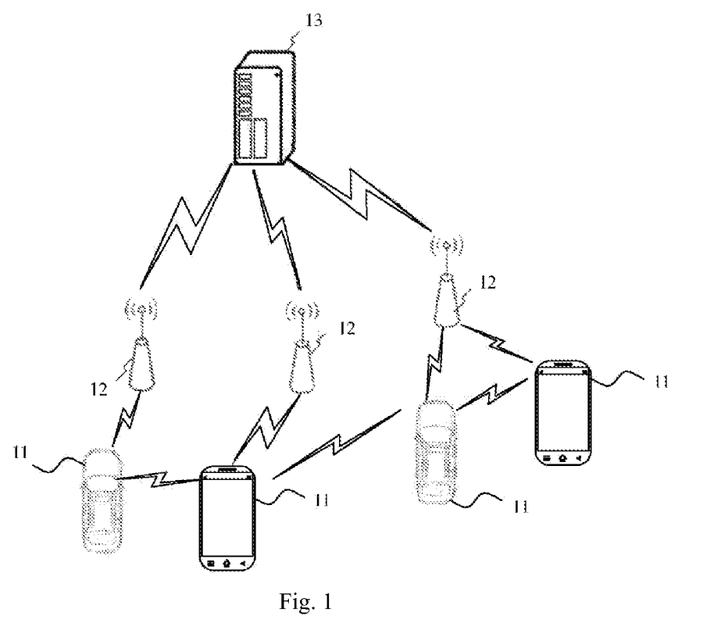
FIG. 1 is a schematic structural diagram of a wireless communication system shown according to an example.

Referring to FIG. 1, a schematic structural diagram of a wireless communication system provided by an example of the disclosure is shown. As shown in FIG. 1, the wireless communication system is a communication system based on the cellular mobile communication technology, and the wireless communication system may include a plurality of terminals 11 and a plurality of base stations 12.

The terminals 11 may be devices for providing voice and/or data connectivity for a user. The terminals 11 may communicate with one or more core networks through a radio access network (RAN), the terminals 11 may be Internet of Things terminals, such as a sensor device, a mobile phone (or called a "cellular" phone) and a computer having Internet of Things terminals, for example, may be a fixed apparatus, a portable apparatus, a pocket apparatus, a handheld apparatus, a computer built-in apparatus or a vehicle-mounted apparatus, such as a station (STA), a subscriber unit, a subscriber station, a mobile station, a mobile, a remote station, an access point, a remote terminal, an access terminal, user equipment, a user agent, a user device, or user equipment (UE). The terminals 11 may also be devices of unmanned aerial vehicles. Further, the terminals 11 may also be vehicle-mounted devices, for example, may be travelling computers with a wireless communication function, or wireless communication devices externally connected to the travelling computers. The terminals 11 may also be infrastructure, for example, street lamps with a wireless communication function, signal lamps or other infrastructure.

The base stations 12 may be network side devices in the wireless communication system. The wireless communication system may be the 4th generation mobile communication (4G) system, also called a long term evolution (LTE) system; or, the wireless communication system may also be a 5G system, also called a new radio (NR) system or a 5G NR system. The wireless communication system may also be the next generation system of the 5G system. An access network of the 5G system may be called the new generation-radio access network (NG-RAN). Further, the wireless communication system may be an MTC system.

The base stations 12 may be evolutionary base stations (eNB) adopted in the 4G system. The base stations 12 may also be base stations (gNB) adopting a concentrated distributed architecture in the 5G system. In response to determining that the base stations 12 adopt the concentrated distributed architecture, the base stations 12 generally include a central unit (CU) and at least two distributed units (DU). Protocol stacks of a packet data convergence protocol (PDCP) layer, a radio link control (RLC) layer, and a media access control (MAC) layer are arranged in the central unit; and protocol stacks of a physical (PHY) layer are arranged in the distributed units. According to the examples of the disclosure, the specific implementation of the base stations 12 is not limited.

Wireless connection may be established between the base stations 12 and the terminals 11 through a radio. In different implementations, the radio is a radio based on the 4th generation mobile communication (4G) technical standard; or, the radio is a radio based on the 5th generation mobile communication (5G) technical standard, for example, the radio is the new radio; or, the radio may also be the radio based on the next generation mobile communication network technical standard of 5G.

In some examples, End to End (E2E) connection may further be established between the terminals 11, such as vehicle to vehicle (V2V) communication, vehicle to infrastructure (V2I) communication and vehicle to pedestrian (V2P) communication and other scenes in vehicle to everything communication (V2X).

In some examples, the above wireless communication system may further include a network management device 13.

The plurality of base stations 12 are respectively connected with the network management device 13. The network management device 13 may be a core network device in the wireless communication system, for example, the network management device 13 may be a mobility management entity (MME) in an evolved packet core (EPC). The network management device may further be other core network devices, such as a serving gateway (SGW), a public data network gateway (PGW), a policy and charging rules function (PCRF) or a home subscriber server (HSS). The example of the disclosure does not limit the implementation form of the network management device 13.

An executive body related to the example of the disclosure includes but is not limited to UE such as a phone terminal supporting cellular mobile communication, the base stations and the like.

An application scene of the example of the disclosure is that in the related art, a difference of EPRE of synchronization signals in an SSB sent by the base stations and EPRE of a PBCH may reach +/−8 dB, namely [−8 dB, 8 dB], and such flexible power configuration is mainly to improve the flexibility of the network; however, a higher requirement is put forward for the UE, and the UE needs to receive the PBCH within the range of [−8 dB, 8 dB] of EPRE of the synchronization signals. The reduced capability UE has the risk of not meeting the requirement due to weakening the capacities such as signal reception.

Figure 2:
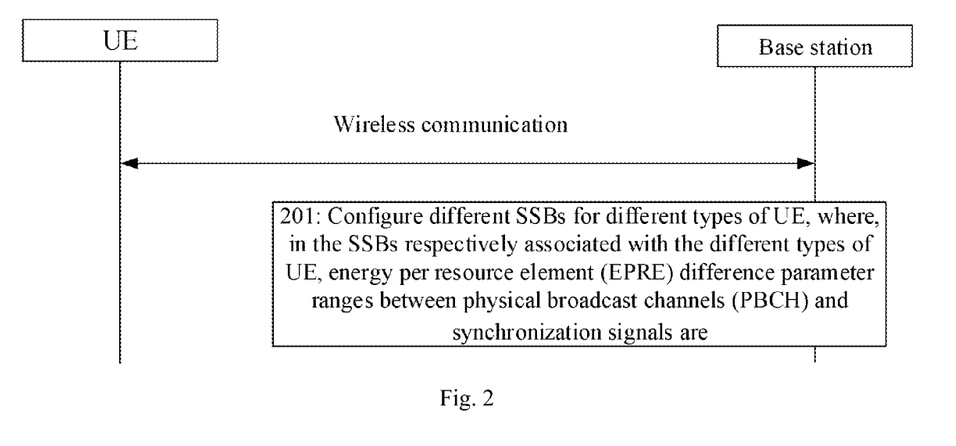
FIG. 2 is a schematic flow diagram of a parameter configuration method shown according to an example.

As shown in FIG. 2, an example provides a parameter configuration method, the parameter configuration method may be applied to the base station of the cellular mobile communication system, and includes step 201.

In step 201 different SSBs are configured for different types of UE, where, in the SSBs respectively associated with the different types of UE, EPRE difference parameter ranges between PBCHs and synchronization signals are different.

Here, the UE may be a phone terminal and the like for wireless communication by adopting the cellular mobile communication technology. The base stations may be communication devices for providing access network interfaces for the UE in the cellular mobile communication system.

The SSB is used for providing necessary information when the UE accesses the wireless communication network. The SSB is composed of synchronization signals and the PBCH. The synchronization signals include primary synchronization signals (PSS) and secondary synchronization signals (SSS). The UE may determine system frame numbers, broadband information, antenna configuration and the like based on the PBCH. The PBCH may be information transmitted by PBCH resources.

In response to determining that the PBCH is received, the UE needs to determine the transmitting power of the PBCH and then accurately receives the PBCH, and generally, the UE may estimate the transmitting power of the PBCH based on the transmitting power of the synchronization signals and a transmitting power difference between the PBCH and the synchronization signals.

Here, the different types of UE may be UE with different wireless signal reception capabilities. For example, the phone terminal and other enhanced mobile broadband (eMBB) UE have the high reception capability, and the reduced capability UE such as a smart watch or the Internet of Things terminal have the lower reception capability.

Here, the different SSBs may be configured for different types of UE. The transmitting power of the PBCHs in different SSBs may be different, or, frequency domain resources of different SSBs are different. Here, an EPRE difference parameter range may be used for representing a difference range and the like of the power between the PBCHs and the synchronization signals. The UE may determine the transmitting power of the PBCHs based on the EPRE difference parameter range, and then accurately receive the PBCHs.

The different transmitting power of the PBCH may meet the reception capability of different types of UE. The base stations may adopt different transmitting power to send the PBCH according to different reception objects, so as to meet the requirement of different types of UE for reception of the PBCH.

For example, the EPRE difference parameter range may be a difference range of the transmitting power of the PBCH relative to the transmitting power of the synchronization signals. Different power difference ranges may be configured according to the different types of UE. For the reduced capability UE with the lower reception capability, the smaller power difference range may be configured, and the requirement for the receptivity of the reduced capability UE is reduced. For the eMBB UE with the higher reception capability, the larger power difference range may be configured, and the coverage flexibility of the wireless communication network is improved.

Thus, according to the different types of UE, the SSBs corresponding to the types of UE are configured. On the one hand, the configuration flexibility of the SSB may be improved. On the other hand, the EPRE difference parameter ranges between different PBCHs and the synchronization signals may adapt to the reception capability of the different types of UE, so that the different types of UE can meet the requirement of the communication network for the SSB reception.

In one example, different types of UE include a first type of UE and a second type of UE; and the signal reception capability of the first type of UE is lower than the signal reception capability of the second type of UE.

The different types of UE may be UE supporting different bandwidths and/or different signal reception capabilities. Here, the data transmission capabilities of the UE with different bandwidths are different, and the data transmission capabilities may include a transmission rate, and/or a transmission delay, and/or a cache size, and/or a capacity for receiving sizes of transmission blocks and the like. The types of UE may be two or more than two. The UE with different signal reception capabilities may have the different number of antennas, and different sensitivity for receiving wireless signals.

For example, the first type of UE and the second type of UE may be two types of the plurality of types of UE. The first type of UE may be the reduced capability UE in the 5G cellular mobile communication system. The second type of UE may be the non-reduced capability UE in the 5G cellular mobile communication system, such as an enhanced mobile broadband (eMBB) terminal. Compared with the second type of UE, the first type of UE supports a smaller bandwidth, and the signal reception capability is weaker.

For example, the EPRE difference parameter range may be the power difference range of the transmission power of the PBCH relative to the transmission power of the synchronization signal. Different power difference ranges may be configured according to different types of UE. For the first type of UE, the smaller power difference range may be configured, and the requirement of the reduced capability UE for the receptivity is reduced. For the second type of UE, the larger power difference range may be configured, and the coverage flexibility of the wireless communication network is improved.

In one example, a first difference range between EPRE of a PBCH in the SSB associated with the first type of UE and EPRE of a synchronization signal in the SSB associated with the first type of UE is less than a second difference range between EPRE of a PBCH in the SSB associated with the second type of UE and EPRE of a synchronization signal in the SSB associated with the second type of UE.

Here, the EPRE difference parameter range may be the difference range of the EPRE of the PBCH relative to the EPRE of the synchronization signal. UE may estimate the power of the PBCH based on the power difference range.

The wireless signal reception capability of the second type of UE such as eMBB UE is higher, and thus, the second type of UE may adapt to a wider difference range. Here, the second difference range may be the fixed difference range adopted in the related art. The difference range of the synchronization signal and the PBCH in the related art is [−8, 8] dB.

The wireless signal reception capability of the first type of UE such as reduced capability UE is lower. Thus, the first type of UE may adapt to a narrower difference range. Here, the first difference range may be configured according to the capability of the UE. The first difference range may be variable.

For example, in the SSB configured for the first type of UE by a system, the difference range between the synchronization signal and the PBCH is [−8, 8] dB. In the SSB configured for the second type of UE by the system, the difference range between the synchronization signal and the PBCH may be smaller than [−8, 8] dB, and may be [−4, 4] dB or [−8, 4] dB and the like.

Thus, the EPRE difference parameter range between the different PBCHs and the synchronization signals may adapt to the reception capability of different types of UE, so that the different types of UE can meet the requirement of the communication network for reception of the SSB.

In one example, in response to the SSB being a cell defined SSB, a first difference range between EPRE of a PBCH in the cell defined SSB associated with the first type of UE and EPRE of a synchronization signal in the cell defined SSB associated with the first type of UE is less than a second difference range between EPRE of a PBCH in the cell defined SSB associated with the second type of UE and EPRE of a synchronization signal in the cell defined SSB associated with the second type of UE.

SSB may be divided into a cell defined SSB and a non-cell defined SSB.

For the random access process, the cell defined SSB is generally adopted. In order to simplify the cell search process of UE, the cell defined SSB generally adopts a fixed configuration, and even a unique configuration.

In order to improve the compatibility of the communication network for different UE, the difference range of the EPRE of the PBCH relative to the EPRE of the synchronization signal may be arranged in cell defined SSB configuration. UE determines the transmitting power of the PBCH based on the difference range.

For the cell defined SSB, the base stations may respectively send the PBCHs for the first type of UE and the second type of UE based on the first difference range and the second difference range. The first type of UE and the second type of UE respectively estimates the power of the PBCHs based on the first difference range and the second difference range.

Figure 3:
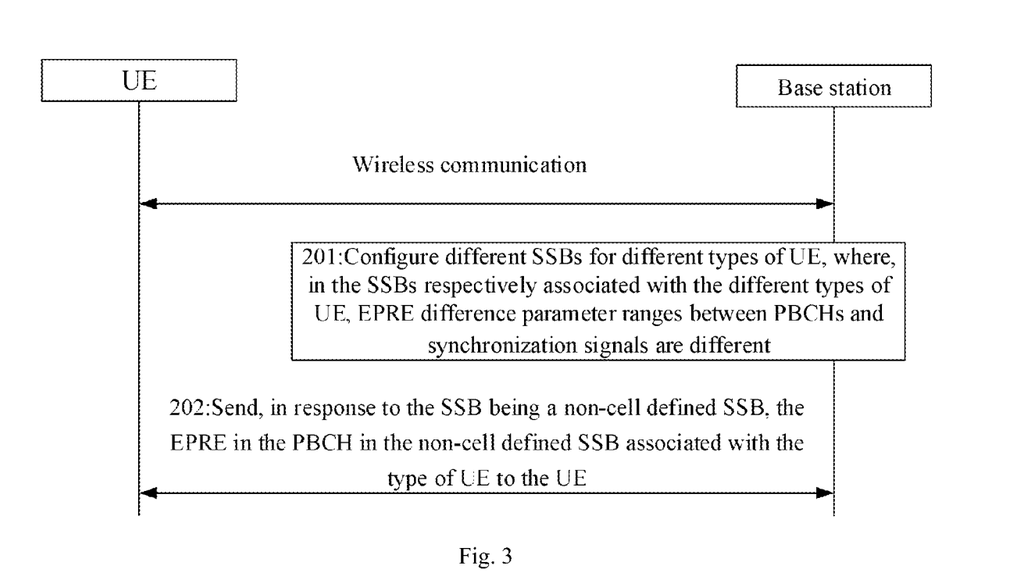
FIG. 3 is a schematic flow diagram of another parameter configuration method shown according to an example.

In an example, as shown in FIG. 3, the method includes step 201 and further includes step 202.

In step 202, in response to the SSB being the non-cell defined SSB, the EPRE of the PBCH in the non-cell defined SSB associated with the type of UE is sent to the UE.

The non-cell defined SSB may be used for signal measurement and the like. The configuration of the non-cell defined SSB may be sent to the UE through base station signaling, so the non-cell defined SSB may be configured by the base stations.

The base stations may send the EPRE of the PBCH to the UE through the signaling and the like. For the first type of UE, the EPRE associated with the first type of UE may be sent. For the second type of UE, the EPRE associated with the second type of UE may be sent.

In one example, sending the EPRE of the PBCH in the non-cell defined SSB associated with the type of UE to the UE includes: RRC signaling carrying indication information is sent to the UE, where, the indication information is used for indicating the EPRE of the PBCH in the non-cell defined SSB associated with the type of the UE.

The EPRE of the PBCH may be sent to the UE by being carried in the RRC signaling.

The base stations may adopt indication information of EPRE of the PBCH carried in a retained bit position of existing RRC signaling. The utilization efficiency of the RRC signaling is improved.

The base stations may also adopt specialized RRC signaling to carry the indication information of the EPRE of the PBCH.

Figure 4:
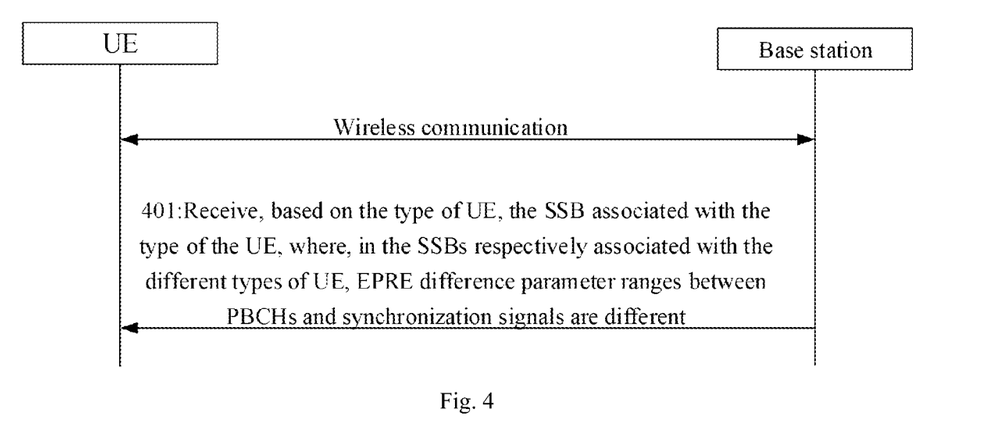
FIG. 4 is a schematic flow diagram of an information transmission method shown according to an example.

As shown in FIG. 4, an example provides an information transmission method, the information transmission method may be applied to the UE of a cellular mobile communication system, and includes step 401.

In step 401, based on the type of the UE, an SSB associated with the type of the UE is received, where, in the SSBs respectively associated with the different types of UE, EPRE difference parameter ranges between PBCHs and synchronization signals are different.

Here, the UE may be a phone terminal and the like for wireless communication by adopting the cellular mobile communication technology. The base stations may be communication devices for providing access network interfaces for the UE in the cellular mobile communication system.

SSB is used for providing necessary information when the UE accesses the wireless communication network. The SSB is composed of synchronization signals and the PBCH. The synchronization signals include primary synchronization signals (PSS) and secondary synchronization signals (SSS). The UE may determine system frame numbers, broadband information, antenna configuration and the like based on the PBCH. The PBCH may be information transmitted by PBCH resources.

When the PBCH is received, the UE needs to determine the transmitting power of the PBCH, and then accurately receives the PBCH. Generally, the UE may estimate the transmitting power of the PBCH based on the transmitting power of the synchronization signals and a transmitting power difference between the PBCH and the synchronization signals.

Here, the different types of UE may be UE with different wireless signal reception capabilities. For example, the phone terminal and other enhanced mobile broadband (eMBB) UE have the high reception capability, and the reduced capability UE such as a smart watch or the Internet of Things terminal have the lower reception capability.

Here, the different SSBs may be configured for different types of UE. The transmitting power of the PBCHs in different SSBs may be different, or, frequency domain resources of different SSBs are different. Here, an EPRE difference parameter range may be used for representing a difference range and the like of the power between the PBCHs and the synchronization signals. The UE may determine the transmitting power of the PBCHs based on the EPRE difference parameter range, and then accurately receive the PBCHs.

The different transmitting power of the PBCH can meet the reception capability of different types of UE. The base stations may adopt different transmitting power to send the PBCH according to different reception objects, so as to meet the requirement of different types of UE for reception of the PBCH.

For example, the EPRE difference parameter range may be the difference range of the transmitting power of the PBCH relative to the transmitting power of the synchronization signals. Different power difference ranges may be configured according to different types of UE. For the reduced capability UE with the lower reception capability, the smaller power difference range may be configured, and the requirement for the receptivity of the reduced capability UE is reduced. For the eMBB UE with the higher reception capability, the larger power difference range may be configured, and the coverage flexibility of the wireless communication network is improved.

Thus, according to the different types of UE, the SSBs corresponding to the types of UE are configured. On the one hand, the configuration flexibility of the SSB may be improved. On the other hand, the EPRE difference parameter ranges between different PBCHs and the synchronization signals may adapt to the reception capability of the different types of UE, so that the different types of UE can meet the requirement of the communication network for the SSB reception.

In one example, different types of UE include a first type of UE and a second type of UE; and the signal reception capability of the first type of UE is lower than the signal reception capability of the second type of UE.

The different types of UE may be UE supporting different bandwidths and/or different signal reception capabilities. Here, the data transmission capabilities of the UE with different bandwidths are different, and the data transmission capabilities may include a transmission rate, and/or a transmission delay, and/or a cache size, and/or a capacity for receiving sizes of transmission blocks and the like. The types of UE may be two or more than two. The UE with different signal reception capabilities may have the different number of antennas, and different sensitivity for receiving wireless signals.

For example, the first type of UE and the second type of UE may be two types of the plurality of types of UE. The first type of UE may be the reduced capability UE in the 5G cellular mobile communication system. The second type of UE may be the non-reduced capability UE in the 5G cellular mobile communication system, such as an enhanced mobile broadband (eMBB) terminal. Compared with the second type of UE, the first type of UE supports a smaller bandwidth, and the signal reception capability is weaker.

For example, the EPRE difference parameter range may be the power difference range of the transmission power of the PBCH relative to the transmission power of the synchronization signal. Different power difference ranges may be configured according to different types of UE. For the first type of UE, the smaller power difference range may be configured, and the requirement of the reduced capability UE for the receptivity is reduced. For the second type of UE, the larger power difference range may be configured, and the coverage flexibility of the wireless communication network is improved.

In one example, a first difference range between EPRE of a PBCH in the SSB associated with the first type of UE and EPRE of a synchronization signal in the SSB associated with the first type of UE is less than a second difference range between EPRE of a PBCH in the SSB associated with the second type of UE and EPRE of a synchronization signal in the SSB associated with the second type of UE.

Here, the EPRE difference parameter range may be the difference range of the EPRE of the PBCH relative to the EPRE of the synchronization signal. UE may estimate the power of the PBCH based on the power difference range.

The wireless signal reception capability of the second type of UE such as eMBB UE is higher, and thus, the second type of UE may adapt to a wider difference range. Here, the second difference range may be the fixed difference range adopted in the related art. The difference range of the synchronization signal and the PBCH in the related art is [−8, 8] dB.

The wireless signal reception capability of the first type of UE such as reduced capability UE is lower. Thus, the first type of UE may adapt to a narrower difference range. Here, the first difference range may be configured according to the capability of UE. The first difference range may be variable.

For example, in the SSB configured for the first type of UE by a system, the difference range between the synchronization signal and the PBCH is [−8, 8] dB. In the SSB configured for the second type of UE by the system, the difference range between the synchronization signal and the PBCH may be smaller than [−8, 8] dB, and may be [−4, 4] dB or [−8, 4] dB and the like.

Thus, the EPRE difference parameter range between the different PBCHs and the synchronization signals may adapt to the reception capability of different types of UE, so that the different types of UE can meet the requirement of the communication network for reception of the SSB.

In one example, in response to the SSB being a cell defined SSB, a first difference range between EPRE of a PBCH in the cell defined SSB associated with the first type of UE and EPRE of a synchronization signal in the cell defined SSB associated with the first type of UE is less than a second difference range between EPRE of a PBCH in the cell defined SSB associated with the second type of UE and EPRE of a synchronization signal in the cell defined SSB associated with the second type of UE.

SSB may be divided into a cell defined SSB and a non-cell defined SSB.

For the random access process, the cell defined SSB is generally adopted. In order to simplify the cell search process of UE, the cell defined SSB generally adopts a fixed configuration, and even a unique configuration.

In order to improve the compatibility of the communication network for different UE, the difference range of the EPRE of the PBCH relative to the EPRE of the synchronization signal may be arranged in cell defined SSB configuration. UE determines the transmitting power of the PBCH based on the difference range.

For the cell defined SSB, the base stations may respectively send the PBCHs for the first type of UE and the second type of UE based on the first difference range and the second difference range. The first type of UE and the second type of UE respectively estimates the power of the PBCHs based on the first difference range and the second difference range.

Figure 5:
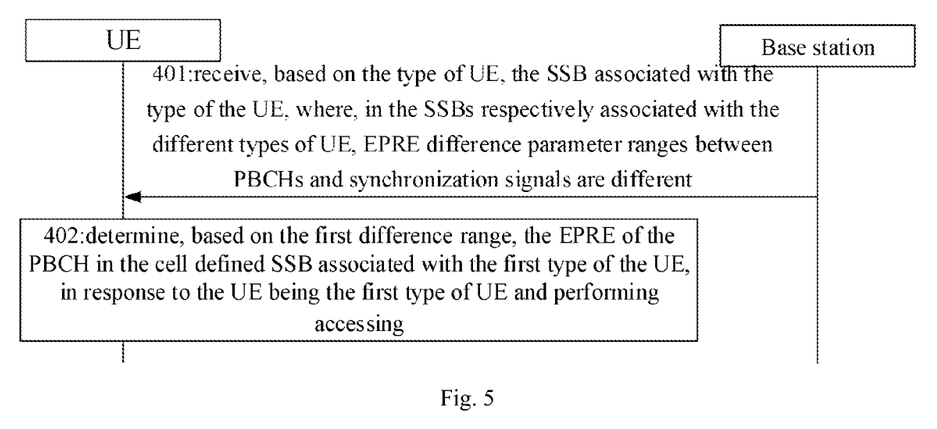
FIG. 5 is a schematic flow diagram of another information transmission method shown according to an example.

In one example, as shown in FIG. 5, the method includes step 401 and further includes step 402.

In step 402, in response to the UE being the first type of UE and performing accessing, and based on the first difference range, the EPRE of the PBCH in the cell defined SSB associated with the first type of UE is determined.

For initial access, the first type of UE may estimate the power of the PBCH based on the first difference range. In the case of non-initial access, the first type of UE may also estimate the power of the PBCH based on the first difference range configured in advance.

In one example, determining, based on the first difference range, the EPRE of the PBCH in the cell defined SSB associated with the first type of the UE, in response to the UE being the first type of UE and performing accessing includes:

in response to performing initial accessing and supporting the first difference range, based on the first difference range, the EPRE of the PBCH in the cell defined SSB associated with the first type of UE is determined.

For initial access, according to the previous stipulation, if it is stipulated that the first difference range may be used, the first type of UE may carry out power estimation according to the first difference range, and if not, the previous concerted range is adopted, that is, the second difference range is adopted for power estimation.

For example, for initial access, according to the previous stipulation, if it is stipulated that the first difference range may be used, the reduced capability UE may carry out power estimation according to the first difference range, for example, power estimation is carried out according to [−4, 4] dB, and if not, the previous concerted range is adopted, that is, the second difference range such as [−8, 8] is adopted for power estimation.

In one example, the method further includes: in response to the SSB being the non-cell defined SSB, the EPRE of the PBCH in the non-cell defined SSB associated with the type of UE sent by the base stations is received.

The non-cell defined SSB may be used for signal measurement and the like. The configuration of the non-cell defined SSB may be sent to the UE through base station signaling, so the non-cell defined SSB may be configured by the base stations.

The base stations may send the EPRE of the PBCH to the UE through the signaling and the like. For the first type of UE, the EPRE associated with the first type of UE may be sent. For the second type of UE, the EPRE associated with the second type of UE may be sent.

In one example, receiving the EPRE of the PBCH in the non-cell defined SSB associated with the type of UE sent by the base station includes: radio resource control (RRC) signaling carrying indication information is received; and according to the indication information, the EPRE of the PBCH in the non-cell defined SSB associated with the type of UE is determined.

The EPRE of the PBCH may be sent to the UE by being carried in the RRC signaling.

The base stations may adopt a retain bit position of the existing RRC signaling to carry the indication information of the EPRE of the PBCH, and the utilization efficiency of the existing RRC signaling is improved.

The base stations may also adopt specialized RRC signaling to carry the indication information of the EPRE of the PBCH.

A specific example is provided below in conjunction with any of the above examples.

If the system configures an individual SSB for the reduced capability (Redcap) UE, a power difference between the synchronization signal and the PBCH in the SSB is not [−8, 8] dB, but a value with a smaller range than above.

The base stations increase configuration information of EPRE values to the UE.

The UE defaults that the EPRE value of the individual SSB of the reduced capability UE configured by the base stations is a defaulted small-range value, such as [−4, 4] dB or [−8, 4] dB.

It may further be stipulated that the EPRE range is assumed to be [−4, 4] dB or [−8, 4] dB when the reduced capability UE is for initial access, and at the moment, the base stations cannot configure power difference values beyond the above range.

On the UE side, the UE estimates the power of the PBCH in case of non-initial access based on the above pre-configured EPRE range.

On the UE side, for initial access, according to the previous stipulation, if it is stipulated that a small range may be used, estimation is carried out according to a power difference of the small range, and if not, the previous concerted range is adopted.

Figure 6:
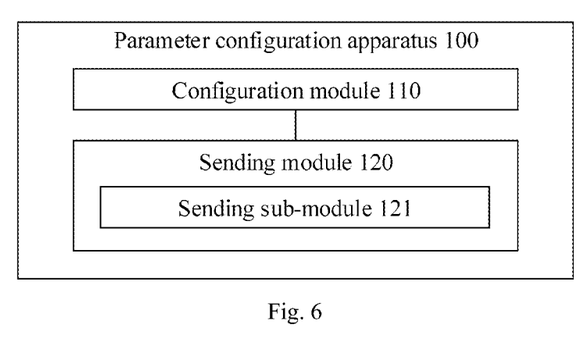
FIG. 6 is a block diagram of a parameter configuration apparatus shown according to an example.

An example of the disclosure further provides a parameter configuration apparatus 100, applied to base stations of wireless communication, as shown in FIG. 6, the parameter configuration apparatus 100 includes: a configuration module 110, where the configuration module 110 is configured to configure different SSBs for the different types of UE, where in the SSBs respectively associated with the different types of UE, EPRE difference parameter ranges between PBCHs and synchronization signals are different.

In one example, different types of UE include a first type of UE and a second type of UE; and the signal reception capability of the first type of UE is lower than the signal reception capability of the second type of UE.

In one example, a first difference range between EPRE of a PBCH in the SSB associated with the first type of UE and EPRE of a synchronization signal in the SSB associated with the first type of UE is less than a second difference range between EPRE of a PBCH in the SSB associated with the second type of UE and EPRE of a synchronization signal in the SSB associated with the second type of UE.

In one example, in response to the SSB being a cell defined SSB, a first difference range between EPRE of a PBCH in the cell defined SSB associated with the first type of UE and EPRE of a synchronization signal in the cell defined SSB associated with the first type of UE is less than a second difference range between EPRE of a PBCH in the cell defined SSB associated with the second type of UE and EPRE of a synchronization signal in the cell defined SSB associated with the second type of UE.

In referring back to FIG. 6, one example, the apparatus 100 further includes: a sending module 120, configured to send, in response to the SSB being a non-cell defined SSB, the EPRE of the PBCH in the non-cell defined SSB associated with the type of UE to the UE.

In one example, the sending module 120 includes: a sending sub-module 121, configured to send RRC signaling carrying indication information to the UE, where the indication information is used for indicating the EPRE of the PBCH in the non-cell defined SSB associated with the type of UE.

Figure 7:
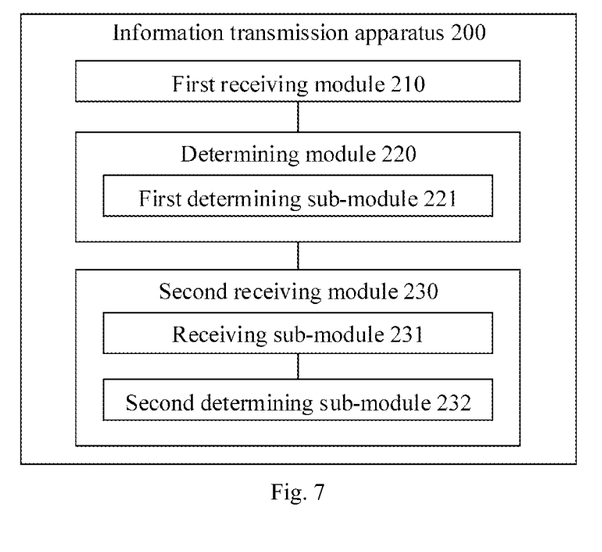
FIG. 7 is a block diagram of another information transmission apparatus shown according to an example.

An example of the disclosure further provides an information transmission apparatus 200, applied to the UE of wireless communication, as shown in FIG. 7, the information transmission apparatus 200 includes a first receiving module 210, where the first receiving module 210 is configured to receive, based on the type of UE, the SSB associated with the type of the UE, where in the SSBs respectively associated with the different types of UE, EPRE difference parameter ranges between PBCHs and synchronization signals are different.

In one example, different types of UE include a first type of UE and a second type of UE; and the signal reception capability of the first type of UE is lower than the signal reception capability of the second type of UE.

In one example, a first difference range between EPRE of a PBCH in the SSB associated with the first type of UE and EPRE of a synchronization signal in the SSB associated with the first type of UE is less than a second difference range between EPRE of a PBCH in the SSB associated with the second type of UE and EPRE of a synchronization signal in the SSB associated with the second type of UE.

In one example, in response to the SSB being a cell defined SSB, a first difference range between EPRE of a PBCH in the cell defined SSB associated with the first type of UE and EPRE of a synchronization signal in the cell defined SSB associated with the first type of UE is less than a second difference range between EPRE of a PBCH in the cell defined SSB associated with the second type of UE and EPRE of a synchronization signal in the cell defined SSB associated with the second type of UE.

In referring to FIG. 7, one example, the apparatus 200 further includes: a determining module 220, configured to determine, based on the first difference range, the EPRE of the PBCH in the cell defined SSB associated with the first type of the UE, in response to the UE being the first type of UE and perform accessing.

In one example, the determining module 220 includes: a first determining sub-module 221, configured to determine, in response to initial accessing and supporting the first difference range, based on the first difference range, the EPRE of a PBCH in the cell defined SSB associated with the first type of UE.

In one example, the apparatus 200 further includes: a second receiving module 230, configured to receive, in response to the SSB being a non-cell defined SSB, the EPRE of a PBCH in the non-cell defined SSB associated with the type of UE sent by base stations.

In one example, the second receiving module 230 includes: a receiving sub-module 231, configured to receive RRC signaling carrying indication information; and a second determining sub-module 232, configured to determine, according to the indication information, the EPRE of a PBCH in the non-cell defined SSB associated with the type of UE.

In an example, the configuration module 110, the sending module 120, the first receiving module 210, the determining module 220 and the second receiving module 230 may be implemented by one or more central processing units (CPU), a graphic processing unit (GPU), a baseband processor (BP), an application specific integrated circuit (ASIC), a DSP, a programmable logic device (PLD), a complex programmable logic device (CPLD), a field-programmable gate array (FPGA), a general processor, a controller, a micro controller unit (MCU), a microprocessor, or other electronic components so as to execute the above-mentioned method.

Figure 8:
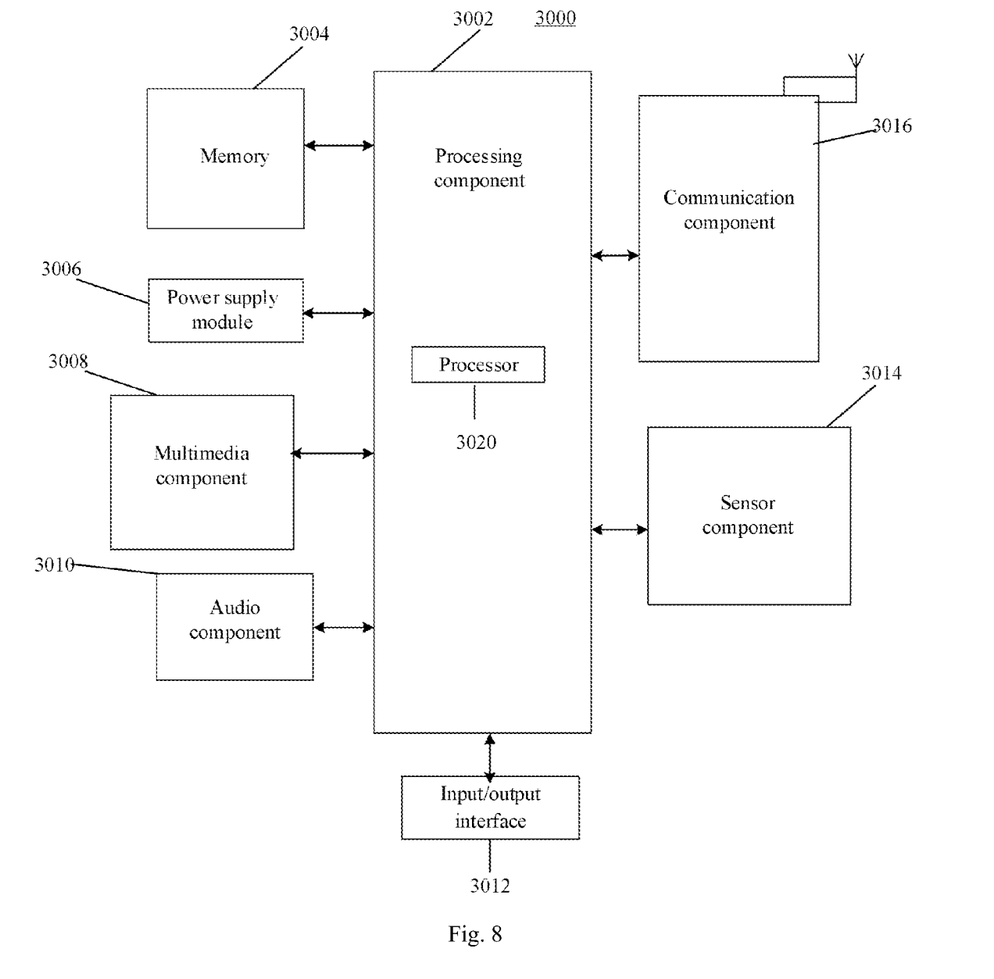
FIG. 8 is a block diagram of an apparatus for parameter configuration or information transmission shown according to an example.

FIG. 8 is a block diagram of an apparatus 3000 for parameter configuration or information transmission shown according to an example. For example, the apparatus 3000 may be a mobile phone, a computer, a digital broadcasting terminal, a message transmitter-receiver, a game console, a panel device, a medical device, a fitness device, a personal digital assistant and the like.

Referring to FIG. 8, the apparatus 3000 may include the following one or more components: a processing component 3002, a memory 3004, a power supply module 3006, a multimedia component 3008, an audio component 3010, an input/output (I/O) interface 3012, a sensor component 3014 and a communication component 3016.

The processing component 3002 generally controls the overall operation of the apparatus 3000, such as operations associated with display, a telephone call, data communication, a camera operation and a record operation. The processing component 3002 may include one or more processors 3020 to execute instructions, so as to complete all or part of steps of the above method. In addition, the processing component 3002 may include one or more modules to facilitate processing of interactions between the processing component 3002 and other components. For example, the processing component 3002 may include a multimedia module to facilitate interactions between the multimedia component 3008 and the processing component 3002.

The memory 3004 is configured to store all kinds of data to support an operation in the apparatus 3000. These data include instructions of any application programs or method operated on the apparatus 3000, contact data, telephone directory data, messages, pictures, videos and the like. The memory 3004 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply module 3006 provides power for various components of the apparatus 3000. The power supply module 3006 may include a power supply management system, one or more power supplies, and other components associated with power generation, management and distribution of the apparatus 3000.

The multimedia component 3008 includes a screen providing an output interface between the apparatus 3000 and a user. In some examples, the screen may include a liquid crystal display (LCD) and a touch panel (TP). If the screen includes the touch panel, the screen may be implemented as a touch screen to receive input signals from the user. The touch panel includes one or more touch sensors to sense touch, sliding and gestures on the touch panel. The touch sensor may not only sense boundaries of touch or sliding actions, but also detect the duration and pressure associated with the touch or sliding actions. In some examples, the multimedia component 3008 includes a front-facing camera and/or a rear-facing camera. In response to determining that the apparatus 3000 is in an operation mode, such as a shooting mode or a video mode, the front-facing camera and/or the rear-facing camera may receive external multimedia data. Each front-facing camera and the rear-facing camera may be a fixed optical lens system or have focal length and optical zoom capacity.

The audio component 3010 is configured to output and/or input audio signals. For example, the audio component 3010 includes a microphone (MIC), in response to determining that the apparatus 3000 is in the operation mode, such as a call mode, a record mode and a voice recognition mode, the microphone is configured to receive the external audio signals. The received audio signals may be further stored in the memory 3004 or sent by the communication component 3016. In some examples, the audio component 3010 further includes a loudspeaker for outputting the audio signals.

The I/O interface 3012 provides an interface between the processing components 3002 and a peripheral interface module, and the above peripheral interface module may be a keyboard, click wheels, buttons and the like. These buttons include but are not limited to: a homepage button, a volume button, a start button and a lock button.

The sensor component 3014 includes one or more sensors, and is used for providing state evaluation of all aspects for the apparatus 3000. For example, the sensor component 3014 may detect an opening/closing state of the apparatus 3000, relative positioning of the components, for example, the components are a display and a keypad of the apparatus 3000, and the sensor component 3014 may further detect position changes of the apparatus 3000 or one component of the apparatus 3000, existence or inexistence of touch of the user and the apparatus 3000, orientation or accelerating/decelerating of the apparatus 3000 and temperature change of the apparatus 3000. The sensor component 3014 may include a proximity sensor, which is configured to detect existence of nearby objects without any physical touch. The sensor component 3014 may further include an optical sensor, such as a CMOS or a CCD image sensor, which is used in imaging application. In some examples, the sensor component 3014 may further include an acceleration sensor, a gyroscope sensor, a magnetic sensor, a pressure sensor or a temperature sensor.

The communication component 3016 is configured to facilitate wired or wireless communication between the apparatus 3000 and other devices. The apparatus 3000 may be switched in a wireless network based on the communication standard, such as WiFi, 2G or 3G, or their combination. In an example, the communication component 3016 receives broadcast signals or broadcast related information from an external broadcast management system through a broadcast channel. In an example, the communication component 3016 further includes a near-field communication (NFC) module to promote short-range communication. For example, the NFC module may be implemented based on the radio frequency identification (RFID) technology, an infrared data association (IrDA) technology, an ultra wide band (UWB) technology, a Bluetooth (BT) technology and other technologies.

In the example, the apparatus 3000 may be implemented by one or more application-specific integrated circuit (ASIC), a digital signal processor (DSP), a digital signal processing device (DSPD), a programmable logic device (PLD), a field programmable gate array (FPGA), a controller, a microcontroller, a microprocessor or other electrical components to execute the above method.

In the example, a non-temporary computer readable storage medium including instructions is further provided, such as the memory 3004 including instructions, and the above instructions may be executed by the processor 3020 of the apparatus 3000 to complete the above method. For example, the non-temporary computer readable storage medium may be an ROM, a random access memory (RAM), a CD-ROM, a magnetic tape, a floppy disk, an optical data storage device and the like.

Those skilled in the art will easily think of other implementation solutions of the disclosure after considering the specification and practicing the invention disclosed here. The disclosure is intended to cover any variations, use or adaptation of the disclosure, these variations, use or adaptation conform to the general principles of the disclosure and include the common knowledge or customary technical means in the technical field not disclosed in the disclosure. The specification and the examples are only examples, and the true scope and spirit of the disclosure are indicated by the claims below.

It should be understood that the examples of the disclosure is not limited to the precise structure described above and shown in the accompanying drawings, and is subjected to various modifications and changes within the scope. The scope of the examples of the disclosure is limited merely by the attached claims.

What is claimed is:

1. A parameter configuration method, applied to a base station, and comprising:
    configuring different synchronization signal blocks (SSB) for different types of user equipment (UE), wherein, in the SSBs respectively associated with the different types of UE, energy per resource element (EPRE) difference parameter ranges between physical broadcast channels (PBCH) and synchronization signals are different.

2. The parameter configuration method according to claim 1, wherein the different types of UE comprise a first type of UE and a second type of UE; and
    the signal reception capability of the first type of UE is lower than the signal reception capability of the second type of UE.

3. The parameter configuration method according to claim 2, wherein
    a first difference range between EPRE of a PBCH in an SSB associated with the first type of UE and EPRE of a synchronization signal in the SSB associated with the first type of UE is less than a second difference range between EPRE of a PBCH in an SSB associated with the second type of UE and EPRE of a synchronization signal in the SSB associated with the second type of UE.

4. The parameter configuration method according to claim 3, wherein
    in response to determining a SSB being a cell defined SSB, a first difference range between EPRE of a PBCH in the cell defined SSB associated with the first type of UE and EPRE of a synchronization signal in the cell defined SSB associated with the first type of UE is less than a second difference range between EPRE of a PBCH in the cell defined SSB associated with the second type of UE and EPRE of a synchronization signal in the cell defined SSB associated with the second type of UE.

5. The parameter configuration method according to claim 1, further comprising:
    sending, in response to determine a SSB being a non-cell defined SSB, EPRE of a PBCH in the non-cell defined SSB to a UE, the non-cell defined SSB being associated with the type of the UE.

6. The parameter configuration method according to claim 5, wherein sending the EPRE of the PBCH in the non-cell defined SSB to the UE comprises:
    sending radio resource control (RRC) signaling carrying indication information to the UE, wherein the indication information is used for indicating the EPRE of the PBCH in the non-cell defined SSB associated with the type of the UE.

7. An information transmission method, applied to user equipment (UE), and comprising:
    receiving, based on the type of the UE, synchronization signal blocks (SSB) associated with the type of the UE, wherein in the SSBs respectively associated with the different types of UE, energy per resource element (EPRE) difference parameter ranges between physical broadcast channels (PBCH) and synchronization signals are different.

8. The information transmission method according to claim 7, wherein the different types of UE comprise: a first type of UE and a second type of UE; and
    the signal reception capability of the first type of UE is lower than the signal reception capability of the second type of UE.

9. The information transmission method according to claim 8, wherein
    a first difference range between EPRE of a PBCH in an SSB associated with the first type of UE and EPRE of a synchronization signal in the SSB associated with the first type of UE is less than a second difference range between EPRE of a PBCH in an SSB associated with the second type of UE and EPRE of a synchronization signal in the SSB associated with the second type of UE.

10. The information transmission method according to claim 9, wherein
    in response to determining a SSB being a cell defined SSB, a first difference range between EPRE of a PBCH in the cell defined SSB associated with the first type of UE and EPRE of a synchronization signal in the cell defined SSB associated with the first type of UE is less than a second difference range between EPRE of a PBCH in the cell defined SSB associated with the second type of UE and EPRE of a synchronization signal in the cell defined SSB associated with the second type of UE.

11. The information transmission method according to claim 10, further comprising:
    determining, based on the first difference range, the EPRE of the PBCH in the cell defined SSB associated with the first type of the UE, in response to the UE being the first type of UE and perform accessing.

12. The information transmission method according to claim 11, wherein determining, based on the first difference range, the EPRE of the PBCH in the cell defined SSB associated with the first type of the UE, in response to the UE being the first type of UE and perform accessing:
    determining, based on the first difference range, the EPRE of the PBCH in the cell defined SSB associated with the first type of UE, in response to performing initial accessing and supporting the first difference range.

13. The information transmission method according to claim 9, further comprising:
    determining, based on the first difference range, the EPRE of the PBCH in the cell defined SSB associated with the first type of the UE, in response to the UE being the first type of UE and performing accessing.

14. The information transmission method according to claim 13, wherein determining, based on the first difference range, the EPRE of the PBCH in the cell defined SSB associated with the first type of the UE, in response to the UE being the first type of UE and performing accessing comprise:
    determining, based on the first difference range, the EPRE of the PBCH in the cell defined SSB associated with the first type of UE, in response to performing initial accessing and supporting the first difference range.

15. The information transmission method according to claim 7, further comprising:
receiving, in response to determining a SSB being the non-cell defined SSB, the EPRE of the PBCH in the non-cell defined SSB associated with the type of the UE sent by a base station.

16. The information transmission method according to claim 15, wherein receiving the EPRE of the PBCH in the non-cell defined SSB associated with the type of the UE sent by the base station comprises:
receiving radio resource control (RRC) signaling carrying indication information; and
determining, according to the indication information, the EPRE of the PBCH in the non-cell defined SSB associated with the type of the UE.

17. A communication device apparatus, comprising a processor, a memory and executable programs stored on the memory and capable of being operated by the processor, wherein the processor is configured to execute the executable programs to:
configure different synchronization signal blocks (SSB) for different types of user equipment (UE), wherein, in the SSBs respectively associated with the different types of UE, energy per resource element (EPRE) difference parameter ranges between physical broadcast channels (PBCH) and synchronization signals are different.

18. A non-transitory storage medium, on which executable programs are stored, wherein in response to determining that the executable programs are executed by a processor, the processor implements the steps of the parameter configuration method according to claim 1.

19. A communication device apparatus, comprising a processor, a memory and executable programs stored on the memory and capable of being operated by the processor, wherein in response to determining that the processor operates the executable programs, the processor executes steps of the information transmission method according to claim 7.

20. A non-transitory computer readable medium, on which executable programs are stored, wherein in response to determining that the executable programs are executed by a processor, the processor implements the steps of the information transmission method according to claim 7.

* * * * *

UNITED STATES PATENT AND TRADEMARK OFFICE
CERTIFICATE OF CORRECTION

| | | |
|---|---|---|
| PATENT NO. | : 12,408,120 B2 | Page 1 of 1 |
| APPLICATION NO. | : 18/025355 | |
| DATED | : September 2, 2025 | |
| INVENTOR(S) | : Yang Liu | |

It is certified that error appears in the above-identified patent and that said Letters Patent is hereby corrected as shown below:

In the Drawings
In Fig. 2, Sheet 2 of 8, for Tag "201", Line 5, delete "are" and insert -- are different --, therefor.

In the Claims
In Column 16, Line 41, in Claim 11, delete "perform" and insert -- performing --, therefor.
In Column 16, Line 46, in Claim 12, delete "perform" and insert -- performing --, therefor.

Signed and Sealed this
Twenty-fifth Day of November, 2025

John A. Squires
*Director of the United States Patent and Trademark Office*